United States Patent
Itani (10) Patent No.: US 9,621,102 B2
(45) Date of Patent: Apr. 11, 2017

(54) INVERTER DEVICE AND PWM SIGNAL CONTROL METHOD

(71) Applicant: Panasonic Intellectual Property Management Co., Ltd., Osaka (JP)

(72) Inventor: Satoru Itani, Kanagawa (JP)

(73) Assignee: PANASONIC INTELLECTUAL PROPERTY MANAGEMENT CO., LTD., Osaka (JP)

(\*) Notice: Subject to any disclaimer, the term of this patent is extended or adjusted under 35 U.S.C. 154(b) by 0 days.

(21) Appl. No.: 14/396,903

(22) PCT Filed: Mar. 8, 2013

(86) PCT No.: PCT/JP2013/001505
§ 371 (c)(1),
(2) Date: Oct. 24, 2014

(87) PCT Pub. No.: WO2013/161159
PCT Pub. Date: Oct. 31, 2013

(65) Prior Publication Data
US 2015/0333687 A1    Nov. 19, 2015

(30) Foreign Application Priority Data

Apr. 25, 2012    (JP) ................. 2012-099868

(51) Int. Cl.
*H02P 27/08*    (2006.01)
*H02M 7/44*    (2006.01)
(Continued)

(52) U.S. Cl.
CPC ............. *H02P 27/08* (2013.01); *H02M 7/44* (2013.01); *H02M 7/5395* (2013.01); *H02P 6/08* (2013.01); *H02M 1/12* (2013.01); *H02M 1/15* (2013.01)

(58) Field of Classification Search
CPC ................... H02M 5/45; H02J 1/008
(Continued)

(56) References Cited

U.S. PATENT DOCUMENTS 8,674,704 B2 \* 3/2014 Kawamura ............ G01R 27/18
324/541
2001/0043103 A1 \* 11/2001 Uehara ................. H03K 5/151
327/175
(Continued)

FOREIGN PATENT DOCUMENTS

EP    2369736 A1    9/2011
JP    05-049286 A    2/1993
(Continued)

OTHER PUBLICATIONS

International Search Report for Application No. PCT/JP2013/001505 dated May 28, 2013.
(Continued)

*Primary Examiner* — Eduardo Colon Santana
*Assistant Examiner* — Devon Joseph
(74) *Attorney, Agent, or Firm* — Pearne & Gordon LLP (57) ABSTRACT

A duty ratio calculation section (5a) of this device calculates target duty ratios of respective phases on the basis of a motor current value. When the target duty ratio of an arbitrary phase (U-phase) has become an uncontrolled duty ratio (for example, 5% or lower or 95% or higher), a duty ratio correction section (5b) obtains corrected duty ratios by either adding or subtracting a differential duty ratio, that is, the difference between the target duty ratio of the arbitrary phase (U-phase) and a controllable duty ratio (for example, 0% or 100%), to or from the target duty ratios of the other phases (V-phase, W-phase). A PWM output section (5c)
(Continued)

applies a PWM signal, which is based on the controllable duty ratio and the corrected duty ratios, to the power device (3).

5 Claims, 8 Drawing Sheets

(51) Int. Cl.
*H02J 1/00* (2006.01)
*H02M 7/5395* (2006.01)
*H02P 6/08* (2016.01)
*H02M 1/12* (2006.01)
*H02M 1/15* (2006.01)

(58) Field of Classification Search
USPC .................................. 363/15, 37; 318/504
See application file for complete search history.

(56) References Cited

U.S. PATENT DOCUMENTS

| | | | | |
|---|---|---|---|---|
| 2005/0178132 | A1* | 8/2005 | Sakaguchi | B60H 1/3205 62/181 |
| 2005/0254265 | A1* | 11/2005 | Yamada | H02M 3/156 363/13 |
| 2006/0198166 | A1* | 9/2006 | Hirono | B60H 1/00428 363/15 |
| 2007/0195568 | A1* | 8/2007 | Sato | H02J 7/0065 363/123 |
| 2008/0281480 | A1* | 11/2008 | Egami | B60K 6/445 701/22 |
| 2009/0108798 | A1* | 4/2009 | Schulz | B60L 15/08 318/802 |
| 2009/0117427 | A1* | 5/2009 | Manabe | H01M 8/04649 429/430 |
| 2010/0045217 | A1* | 2/2010 | Ueda | B62D 5/046 318/400.02 |
| 2010/0259206 | A1* | 10/2010 | Joachimsmeyer | H02M 7/5395 318/400.17 |
| 2011/0211374 | A1* | 9/2011 | Yoshida | H02M 1/4225 363/37 |
| 2011/0214934 | A1* | 9/2011 | Ueda | B62D 5/046 180/446 |
| 2011/0234138 | A1* | 9/2011 | Kuratani | B62D 5/0487 318/490 |
| 2012/0326750 | A1* | 12/2012 | Yong | H03K 5/156 326/52 |
| 2014/0159627 | A1* | 6/2014 | Lee | H02P 29/027 318/400.22 |
| 2015/0303839 | A1* | 10/2015 | Ueno | H02P 27/08 318/400.22 |

FOREIGN PATENT DOCUMENTS

| | | |
|---|---|---|
| JP | 09-140142 A | 5/1997 |
| JP | 11-146685 A | 5/1999 |
| JP | 2003-348877 A | 12/2003 |

OTHER PUBLICATIONS

Written Opinion for Application No. PCT/JP2013/001505 dated Feb. 21, 2014.
Supplementary European Search Report dated Mar. 11, 2016 for EP 13780773.

* cited by examiner

INVERTER DEVICE AND PWM SIGNAL CONTROL METHOD

TECHNICAL FIELD

The present invention relates to an inverter apparatus and a PWM signal control method that controls a brushless motor for driving an electrically-driven compressor or the like.

BACKGROUND ART

Conventionally, three-phase brushless motors using a signal generated by an inverter as a drive power supply are often used for motors to drive power compressors used for air conditioning apparatuses or the like because such motors have high energy efficiency. In this case, the inverter performs PWM (pulse width modulation) control, applied voltage control and frequency control, and can thereby easily drive the three-phase brushless motor (hereinafter, simply referred to as "motor") to rotate. Furthermore, the inverter can control rotation of the motor without any position sensors by detecting an induced voltage generated in a coil of the motor. The inverter performs applied voltage control and frequency control of the motor by controlling a duty ratio (ratio of an ON period to a one-cycle period) of a PWM signal for controlling a power device. In addition, the inverter performs motor control by detecting an output voltage or output current of the inverter through a microcontroller and feeding it back to applied voltage control.

As a related art, a technique is disclosed in which PWM-controls an output voltage of an inverter using a microcontroller to thereby drive a motor to rotate (e.g., see PTL 1). According to this technique, when an inverter that performs position sensor-less control detects an induced voltage of the motor and detects and estimates the position of a rotor, it is possible to estimate the position of the rotor with high accuracy by detecting a potential of a virtual neutral point of the motor. This makes it possible to estimate the position of the rotor with high accuracy without using any position sensors to detect the position of the rotor and achieve high efficiency drive of the motor and stable rotation speed.

CITATION LIST

Patent Literature

PTL 1
Japanese Patent Application Laid-Open No. HEI 11-146685

SUMMARY OF INVENTION

Technical Problem

When the microcontroller PWM-controls an output voltage of the inverter to drive the motor to rotate, the microcontroller controls a duty ratio of the PWM signal within a range of 0 to 100% according to a state of load of an electrically-driven compressor driven by the motor. One cycle of a carrier frequency of the PWM signal at this time is, for example, on the order of 100 μs. However, microcontrollers used for home appliances such as air conditioning apparatus are generally not provided with high resolution (performance dependent on frequency characteristic) over the entire range of 0 to 100%, and it is therefore not possible to control a duty width of several μs in the vicinity of 0% or in the vicinity of 100%.

In other words, when general-purpose microcontrollers used for home appliances are used, the microcontrollers cannot perform PWM control at a desired duty ratio in the vicinity of 0% or in the vicinity of 100% of a duty ratio of a PWM waveform. For example, there may be cases where the duty ratio becomes 0% when a 3% duty ratio is desirable and the duty ratio becomes 100% when a duty ratio of 97% is desirable.

The inverter performs PWM control by setting the duty ratio to, for example, 0% when a phase voltage is 0 V in each of U phase, V phase and W phase of the motor, setting the duty ratio to 100% when the respective phase voltages are maximum values and setting the duty ratio to one corresponding to a phase voltage in a range of phase voltage from 0 V to the maximum value. However, when the aforementioned general-purpose microcontroller is used, the duty ratio may become 100% although a duty ratio of 97% is desirable. The duty ratio may also become 0% when a duty ratio of 3% is desirable. As a result, phase voltages are distorted in each of U phase, V phase and W phase of the motor, and so inter-line voltages of the motor are also distorted.

When inter-line voltages of the motor are distorted, the torque of the motor becomes smaller or greater than a desired value, which makes it impossible to perform drive control on the electrically-driven compressor or a torque ripple of the motor may increase, generating a sound or vibration in the motor. As a result, the control performance of the electrically-driven compressor decreases, making it impossible to continuously operate an air conditioning apparatus or the like with high efficiency.

An object of the present invention is to provide an inverter apparatus and a PWM signal control method that enable the application of voltage to a motor by preventing distortion of an inter-line voltage of the motor even in an inverter that performs PWM control using a general-purpose microcontroller.

Solution to Problem

In order to achieve the object mentioned above, an inverter apparatus according to an aspect of the present invention is an apparatus that generates a signal for driving a multi-phase motor, the apparatus including: a power device that converts DC power to AC power based on PWM signals and that outputs the AC power; and a control section that controls a duty ratio for each phase of the multi-phase motor and that outputs the PWM signals based on the duty ratio to the power device, in which: when a target duty ratio of an arbitrary phase of the multi-phase motor becomes an uncontrolled duty ratio which is a duty ratio uncontrollable in the arbitrary phase, the control section calculates a difference duty ratio which is a difference between a controllable duty ratio which is a duty ratio controllable in the arbitrary phase and the target duty ratio of the arbitrary phase, and the control section outputs to the power device, the PWM signals based on the controllable duty ratio for the arbitrary phase and the PWM signals based on corrected duty ratios obtained by adding or subtracting the difference duty ratio with respect to the respective target duty ratios for other phases except the arbitrary phase.

A PWM signal control method according to an aspect of the present invention is a method for an inverter apparatus that generates a signal for driving a multi-phase motor, the method including: calculating, when a target duty ratio of an arbitrary phase of the multi-phase motor becomes an uncontrolled duty ratio which is a duty ratio uncontrollable in the arbitrary phase, a difference duty ratio which is a difference between a controllable duty ratio which is a duty ratio controllable in the arbitrary phase and the target duty ratio of the arbitrary phase; generating PWM signals based on the controllable duty ratio for the arbitrary phase; and generating PWM signals based on corrected duty ratios obtained by adding or subtracting the difference duty ratio with respect to the respective target duty ratios for other phases except the arbitrary phase.

Advantageous Effects of Invention

When, for example, a power device is PWM-controlled using a general-purpose microcontroller, the present invention can make corrections, even when the duty ratio becomes uncontrollable, so as to prevent distortion of an inter-line voltage waveform of the motor. This eliminates a ripple component of a motor current, and thus can drive the motor to rotate stably with highly efficiency. As a result, it is possible to suppress sound or vibration generated in the motor and electrically-driven compressor which is a load of the motor. In addition, it is possible to use a low-priced microcontroller and thereby reduce costs of the inverter apparatus and an air conditioning apparatus using the inverter apparatus or the like. Moreover, since a low-priced and general-purpose microcontroller can be used, it is possible to expand a selection range of the microcontroller used for the inverter apparatus.

DESCRIPTION OF EMBODIMENTS

<<Overview>>

When a general-purpose microcontroller having normal resolution (performance depending on a frequency characteristic) controls a duty ratio of a PWM signal applied to a power device of an inverter that drives a motor, if a duty ratio (target duty ratio) of a certain phase (e.g., U phase) becomes an uncontrollable duty ratio (hereinafter, referred to as "uncontrolled duty ratio"), the present invention sets a controllable duty ratio. The present invention then calculates a difference between a target duty ratio of the phase (U phase) and the controllable duty ratio (difference duty ratio), and adds the difference duty ratio to the target duty ratio or subtracts the difference duty ratio from the target duty ratio, and thereby calculates a corrected duty ratio (=controllable duty ratio). The present invention then adds the difference duty ratio to a target duty ratio of another phase (e.g., V phase or W phase) or subtracts the difference duty ratio from the target duty ratio. This allows a voltage of a desired waveform (sine wave) to be applied as each inter-line voltage which is a potential difference between the respective phases. Furthermore, since waveform distortion of an applied voltage to the motor is eliminated, it is possible to suppress torque ripple of the motor to a low level and drive the motor to rotate stably with high efficiency.

For example, since the U phase of the inverter output cannot be controlled with a desired duty ratio of over 0% and less than 5% or over 95% and less than 100%, when the duty ratio becomes an uncontrolled duty ratio of over 0% and less than 5% or over 95% and less than 100%, a difference duty ratio which is a difference between the target duty ratio of the U phase and a controllable duty ratio (0%, 100%) is added to the target duty ratios of the V phase and W phase or subtracted from the target duty ratios. In this way, since the difference between the target duty ratio of the U phase and the controllable duty ratio is added to (or subtracted from) each of the target duty ratios of the V phase and the W phase, each inter-line voltage between the U phase and V phase, between the V phase and W phase, and between the W phase and U phase becomes a voltage of a desired waveform (sine wave), allowing a desired voltage to be applied to the motor.

Hereinafter, an embodiment of the present invention will be described in detail with reference to the accompanying drawings. Among all drawings used to describe the embodiment, the same elements will be assigned the same reference numerals in principle and repetitive description thereof will be omitted. A case will be described below where a power device is PWM-controlled by an inverter apparatus.

(Embodiment)

<Configuration of Inverter Apparatus>

Figure 1:
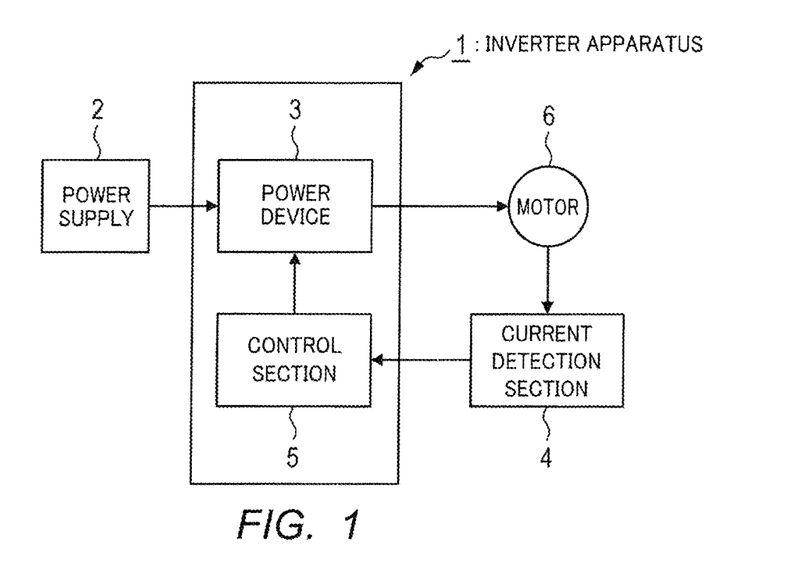
FIG. 1 is a block diagram illustrating a configuration of an inverter apparatus and peripherals according to an embodiment of the present invention.

FIG. 1 is a block diagram illustrating a configuration of an inverter apparatus and peripherals according to an embodiment of the present invention. As shown in FIG. 1, inverter apparatus 1 is mainly constructed of power device 3 and control section 5. Power device 3 turns ON or OFF DC power supplied from power supply 2 according to a PWM signal applied from control section 5. Thus, power device 3 converts DC power to AC power and supplies the AC power to motor 6. Current detection section 4 detects a motor current that flows from power device 3 into motor 6. Control section 5 controls power device 3 by applying to power device 3, a PWM signal with a target duty ratio corresponding to a current value detected by current detection section 4 and a target rotation speed or a corrected duty ratio. Power supply 2 may be implemented by an AC power supply such as commercial power supply, a rectification circuit and a smoothing circuit, or only a storage battery.

Figure 2:
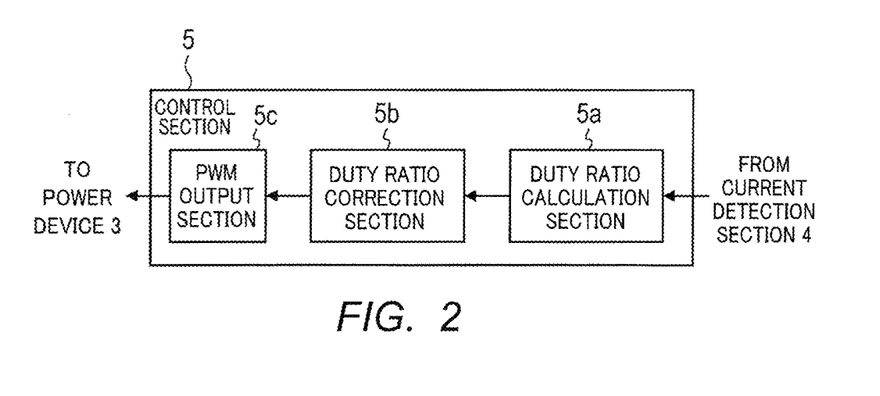
FIG. 2 is a block diagram illustrating an internal configuration of a control section shown in FIG. 1.

FIG. 2 is a block diagram illustrating an internal configuration of control section 5 shown in FIG. 1. As shown in FIG. 2, the inside of control section 5 is constructed of duty ratio calculation section 5a that calculates a target duty ratio of each phase (U phase, V phase, W phase) so that the motor is rotated at a desired number of revolutions according to the value of a motor current detected by current detection section 4, duty ratio correction section 5b that determines, when a target duty ratio of a certain phase (e.g., U phase) calculated by duty ratio calculation section 5a becomes an uncontrolled duty ratio (e.g., duty ratio of less than 5% or over 95%), a corrected duty ratio for correcting target duty ratios of its own phase and other phases (e.g., V phase, W phase), and a PWM output section 5c that controls the power device of each phase (U phase, V phase, W phase) by a PWM signal of the corrected duty ratio corrected by duty ratio correction section 5b.

<Operation of Inverter Apparatus>

Next, operation of the inverter apparatus of the present embodiment will be described with reference to FIG. 1 and FIG. 2. When a frequency of a voltage applied from power device 3 to motor 6 is, for example, 100 Hz, control section 5 performs PWM control at a carrier frequency whose one cycle is 100 μs (10 kHz). Therefore, a voltage waveform whose one cycle is 10 ms is controlled by a PWM signal of 100 pulses. At this time, when the voltage waveform of each phase of inverter apparatus 1 is 0 V, the target duty ratio of the PWM signal has a value of 0%. When the voltage waveform of each phase of the inverter apparatus 1 is a supply voltage peak value, the target duty ratio of the PWM signal has a value of 100%. Furthermore, when the voltage is between 0% and 100%, the target duty ratio is controlled according to a change of a sine-wave-like voltage. Note that the frequency of the applied voltage of the inverter apparatus 1 is not fixed to 100 Hz but is enabled to be variably controlled to an arbitrary frequency.

Under such preconditions, duty ratio calculation section 5a of control section 5 calculates a current number of revolutions from the magnitude of the motor current of motor 6 detected by current detection section 4 and calculates a target duty ratio from a difference from the target number of revolutions. For example, when the current number of revolutions is larger than the target number of revolutions, the target duty ratio of the PWM signal calculated by duty ratio calculation section 5a decreases.

On the other hand, when the current number of revolutions is smaller than the target number of revolutions, the target duty ratio of the PWM signal calculated by duty ratio calculation section 5a increases.

Duty ratio correction section 5b corrects a duty ratio in accordance with a target duty ratio calculated by duty ratio calculation section 5a of control section 5. That is, when the target duty ratio of the U phase calculated by duty ratio calculation section 5a becomes an uncontrolled duty ratio (e.g., duty ratio of over 0% and less than 5% or over 95% and less than 100%), duty ratio correction section 5b corrects target duty ratios of the V phase and W phase. For example, when the target duty ratio of the U phase becomes an uncontrolled duty ratio (over 0% and less than 5% or over 95% and less than 100%), duty ratio correction section 5b calculates a difference duty ratio which is a difference between the target duty ratio of the U phase and the controllable duty ratio (0% or 100% or 5% or above and 95% or below) and sets a corrected duty ratio obtained by adding or subtracting the difference duty ratio with respect to the target duty ratio of each phase (U phase, V phase, W phase). Note that if the target duty ratio of the U phase calculated by duty ratio calculation section 5a is a controllable duty ratio, duty ratio correction section 5b makes no correction.

Next, PWM output section 5c PWM-controls each phase (U phase, V phase, W phase) of power device 3 using a PWM signal of the corrected duty ratio calculated by duty ratio correction section 5b. For example, when the target duty ratio of the U phase is 97%, if a duty ratio of 100% is set, PWM output section 5c outputs to the V phase and W phase, PWM signals with corrected duty ratios obtained by adding 3% (100%–97%) of the difference duty ratio to the target duty ratios to be originally controlled for the V phase and W phase.

Figure 3:
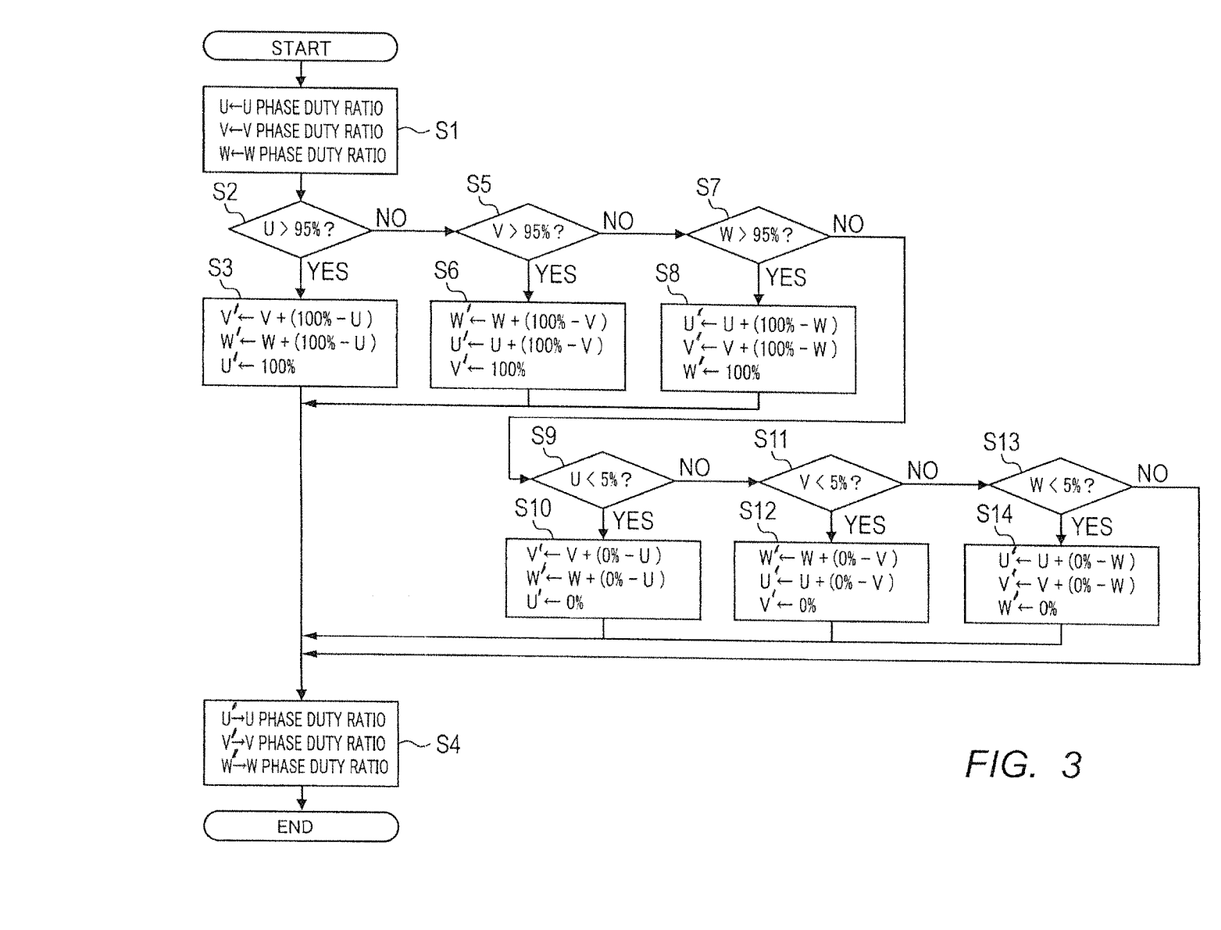
FIG. 3 is a flowchart illustrating an operation flow of the inverter apparatus according to the present embodiment.

Next, operation of the inverter apparatus of the present embodiment will be described with reference to a flowchart. FIG. 3 is a flowchart illustrating an operation flow of the inverter apparatus according to the present embodiment. In FIG. 3, when PWM-controlling power device 3 first, control section 5 sets the U phase to the U phase duty ratio, the V phase to the V phase duty ratio and the W phase to the W phase duty ratio as target duty ratios of the respective phases (step S1). Next, control section 5 determines whether the set U phase duty ratio exceeds 95% or not (step S2).

Here, if the U phase duty ratio exceeds 95% (step S2: YES), control section 5 performs a correction as shown in step S3. That is, in step S3, since the U phase duty ratio cannot be controlled to the target duty ratio, a duty ratio of controllable 100% is set, and control section 5 assumes a value (corrected duty ratio) obtained by adding a difference (difference duty ratio) between 100% and the target duty ratio of the U phase to the original V phase duty ratio as a corrected V phase duty ratio. Furthermore, control section 5 assumes a value (corrected duty ratio) obtained by adding a difference (difference duty ratio) between 100% and the target duty ratio of the U phase to the original W phase duty ratio as a corrected W phase duty ratio.

In step S4, control section 5 PWM-controls the U phase of power device 3 at the corrected U phase duty ratio, PWM-controls the V phase of power device 3 at the corrected V phase duty ratio and PWM-controls the W phase of power device 3 at the corrected W phase duty ratio based on the corrected duty ratios determined in step S3.

In step S2, if the U phase duty ratio does not exceed 95% (step S2: NO), control section 5 determines whether the set V phase duty ratio exceeds 95% or not (step S5). Here, if the V phase duty ratio exceeds 95% (step S5: YES), a correction as shown in step S6 is performed. That is, in step S6, since the V phase duty ratio cannot be controlled to a target duty ratio, the V phase duty ratio is assumed to be a 100% controllable duty ratio, and control section 5 assumes a value (corrected duty ratio) obtained by adding a difference (difference duty ratio) between 100% and the target duty ratio of the V phase to the original W phase duty ratio as a corrected W phase duty ratio. In addition, control section 5 assumes a value (corrected duty ratio) obtained by adding a difference (difference duty ratio) between 100% and the target duty ratio of the V phase to the original U phase duty ratio as a corrected U phase duty ratio.

In step S4, control section 5 PWM-controls the U phase of power device 3 at the corrected U phase duty ratio, PWM-controls the V phase of power device 3 at the corrected V phase duty ratio and PWM-controls the W phase of power device 3 at the corrected W phase duty ratio based on the corrected duty ratios determined in step S6.

Meanwhile, when the V phase duty ratio does not exceed 95% in step S5 (step S5: NO), control section 5 determines whether the set W phase duty ratio exceeds 95% or not (step S7). Here, if the W phase duty ratio exceeds 95% (step S7: YES), a correction as shown in step S8 is performed. That is, in step S8, since the duty ratio of the W phase cannot be controlled to a target duty ratio, a 100% controllable duty ratio is set and control section 5 assumes a value (corrected duty ratio) obtained by adding a difference (difference duty ratio) between 100% and the target duty ratio of the W phase to the original U phase duty ratio as a corrected U phase duty ratio. Furthermore, control section 5 assumes a value (corrected duty ratio) obtained by adding a difference (difference duty ratio) between 100% and the target duty ratio of the W phase to the original V phase duty ratio as a corrected V phase duty ratio.

In step S4, control section 5 PWM-controls the U phase of power device 3 at the corrected U phase duty ratio, PWM-controls the V phase of power device 3 at the corrected V phase duty ratio and PWM-controls the W phase of power device 3 at the corrected W phase duty ratio based on the corrected duty ratios determined in step S8.

On the other hand, if the W phase duty ratio does not exceed 95% in step S7 (step S7: NO), control section 5 determines whether the U phase duty ratio falls below 5% or not (step S9). Here, if the U phase duty ratio falls below 5% (step S9: YES), a correction as shown in step S10 is performed. That is, in step S10, since the duty ratio of the U phase cannot be controlled to a target duty ratio, a 0% controllable duty ratio is set, and control section 5 assumes a value (corrected duty ratio) obtained by adding a difference (difference duty ratio) between 0% and the target duty ratio of the U phase to the original V phase duty ratio as a corrected V phase duty ratio. In addition, control section 5 assumes a value (corrected duty ratio) obtained by adding a difference (difference duty ratio) between 0% and the target duty ratio of the U phase to the original W phase duty ratio as a corrected W phase duty ratio.

In step S4, control section 5 PWM-controls the U phase of power device 3 at the corrected U phase duty ratio, PWM-controls the V phase of power device 3 at the corrected V phase duty ratio and PWM-controls the W phase of power device 3 at the corrected W phase duty ratio based on the corrected duty ratios determined in step S10.

In step S9, if the U phase duty ratio exceed 5% (step S9: NO), control section 5 determines whether the V phase duty ratio falls below 5% or not (step S11). Here, if the V phase duty ratio falls below 5% (step S11: YES), a correction as shown in step S12 is performed. That is, in step S12, since the V phase duty ratio cannot be controlled to the target duty ratio, a 0% controllable duty ratio is set and control section 5 assumes a value (corrected duty ratio) obtained by adding a difference (difference duty ratio) between 0% and the V phase target duty ratio to the original W phase duty ratio as a corrected W phase duty ratio. Furthermore, control section 5 assumes a value (corrected duty ratio) obtained by adding a difference (difference duty ratio) between 0% and the V phase target duty ratio to the original U phase duty ratio as a corrected U phase duty ratio.

In step S4, control section 5 PWM-controls the U phase of power device 3 at the corrected U phase duty ratio, PWM-controls the V phase of power device 3 at the corrected V phase duty ratio and PWM-controls the W phase of power device 3 at the corrected W phase duty ratio based on the corrected duty ratio determined in step S12.

On the other hand, in step S11, if the V phase duty ratio exceed 5% (step S11: NO), control section 5 determines whether the W phase duty ratio falls below 5% or not (step S13). Here, if the W phase duty ratio falls below 5% (step S13: YES), a correction as shown in step S14 is performed. That is, in step S14, since the W phase duty ratio cannot be controlled to a target duty ratio, a 0% controllable duty ratio is set and control section 5 assumes a value (corrected duty ratio) obtained by adding a difference (difference duty ratio) between 0% and the W phase target duty ratio to the original U phase duty ratio as a corrected U phase duty ratio. Furthermore, control section 5 assumes a value (corrected duty ratio) obtained by adding a difference (difference duty ratio) between 0% and the W phase target duty ratio to the original V phase duty ratio as a corrected V phase duty ratio.

In step S4, control section 5 PWM-controls the U phase of power device 3 at the corrected U phase duty ratio, PWM-controls the V phase of power device 3 at the corrected V phase duty ratio and PWM-controls the W phase of the power device 3 at the corrected W phase duty ratio based on the corrected duty ratios determined in step S14.

On the other hand, if the W phase duty ratio exceed 5% in step S13 (step S13: NO), in step S4, control section 5 PWM-controls the U phase of power device 3 at the U phase duty ratio, PWM-controls the V phase of power device 3 at the V phase duty ratio and PWM-controls the W phase of power device 3 at the W phase duty ratio based on the initially set target duty ratios.

In the flowchart in FIG. 3, it is checked whether PWM control is possible with an upper limit value (e.g., 95%) of the target duty ratio or not and it is checked whether PWM control is possible with a lower limit value (e.g., 5%) of the target duty ratio or not, but it is also possible to check with only an upper limit value of the target duty ratio or check with only a lower limit value of the target duty ratio. In the flowchart in FIG. 3, checking is started with an upper limit value first, but checking can also be started with a lower limit value first. In the flowchart in FIG. 3, a correction is made simultaneously with checking, but only checking may be performed first and the priority order of corrections may be order in which PWM controllable is changed to PWM uncontrollable or in the reverse order. In the flowchart in FIG. 3, although the upper limit value of the target duty ratio is assumed to be 95% and the lower limit value thereof is assumed to be 5% at which PWM control is possible, these values are specific values determined by a microcontroller or peripheral circuit. Therefore, the upper limit value and the lower limit value of the target duty ratio at which PWM control is possible are determined by a value specific to the selected microcontroller or peripheral circuit (e.g., dead time to prevent an upper arm and lower arm of each phase of the power device from being simultaneously turned ON). That is, it is also possible to determine according to the selected microcontroller that the upper limit value of the target duty ratio at which PWM control is possible is, for example, 98% and the lower limit value is, for example, 2%.

EXAMPLES

Next, specific examples of an inter-line voltage waveform applied from the power device to the motor in a case where the inverter apparatus of the present embodiment performs the aforementioned duty ratio corrections will be described. In the following examples, in order to illustrate the superiority of duty ratio corrections according to the present embodiment, a comparison will be made between an ideal voltage waveform, a voltage waveform when duty ratio correction is not performed through PWM control using a general-purpose microcontroller and a voltage waveform when duty ratio correction is performed through PWM control using a general-purpose microcontroller.

Figure 4:
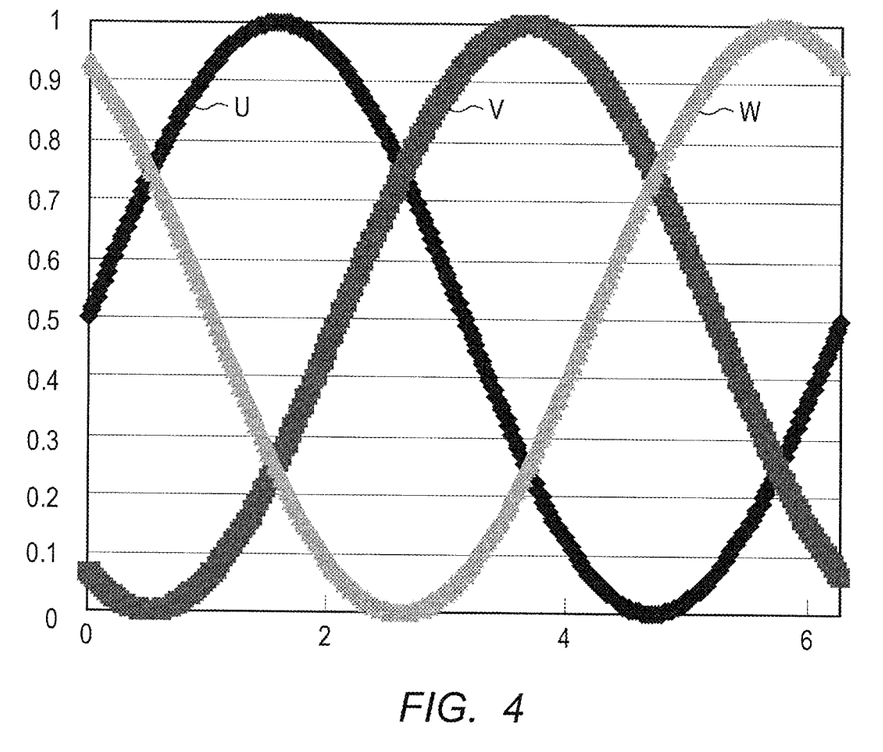
FIG. 4 illustrates ideal phase voltage waveforms of a U phase, V phase and W phase when an inter-line voltage is applied to a three-phase motor.
Figure 5:
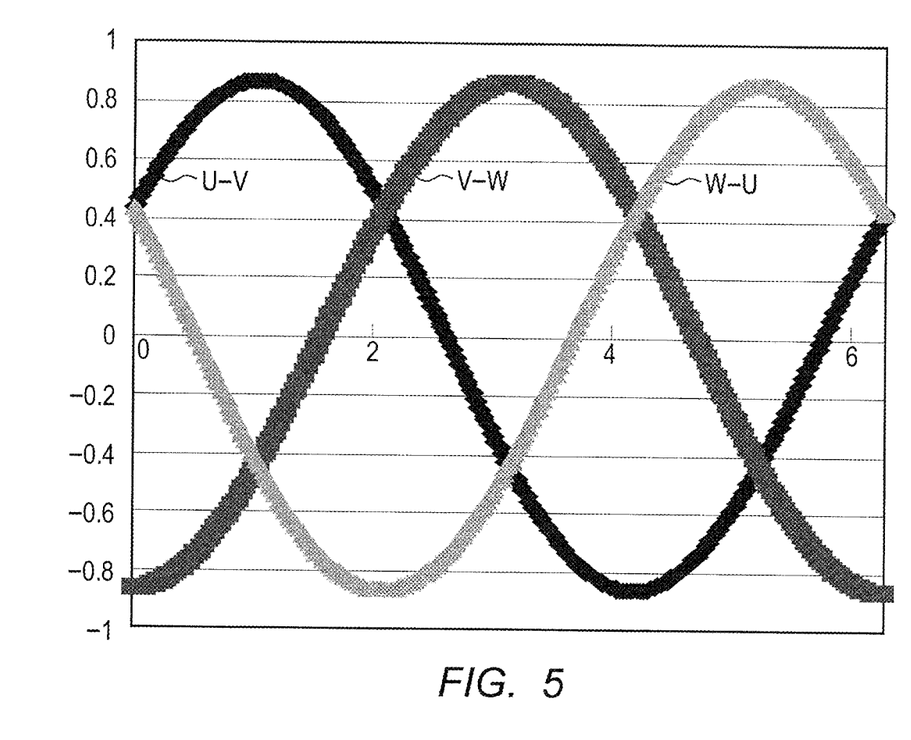
FIG. 5 illustrates waveforms of the inter-line voltages between U phase and V phase, between V phase and W phase and between W phase and U phase produced by the phase voltages as shown in FIG. 4.

FIG. 4 illustrates ideal phase voltage waveforms of the U phase, V phase and W phase when an inter-line voltage is applied to a three-phase motor with the horizontal axis representing a time scale and the vertical axis representing a voltage level. FIG. 5 illustrates waveforms of the respective inter-line voltages between U phase and V phase, between V phase and W phase and between W phase and U phase produced by the phase voltages shown in FIG. 4 with the horizontal axis representing a time scale and the vertical axis representing a voltage level. In the case of the sine-wave-like phase voltages as shown in FIG. 4, the inter-line voltages applied between U phase and V phase, between V phase and W phase and between W phase and U phase of the three-phase motor also have ideal sine waves as shown in FIG. 5.

Figure 6:
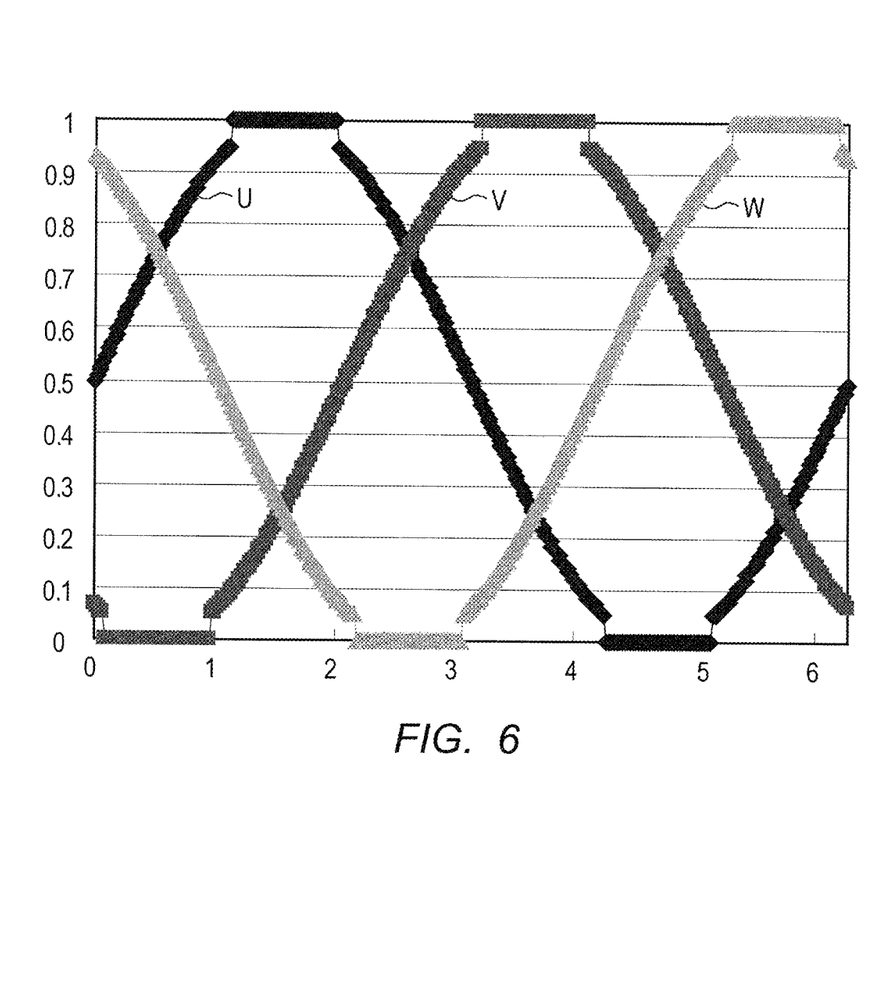
FIG. 6 illustrates phase voltage waveforms of U phase, V phase and W phase when no duty ratio correction is made through PWM control of a power device by a general-purpose microcontroller.
Figure 7:
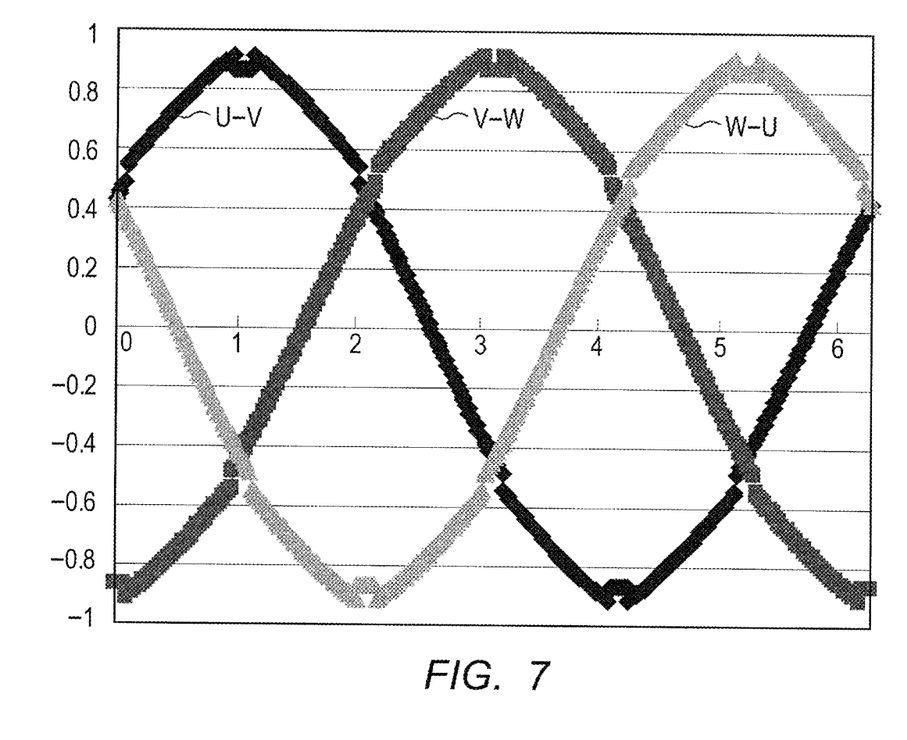
FIG. 7 illustrates waveforms of the inter-line voltages between U phase and V phase, between V phase and W phase and between W phase and U phase produced by the phase voltages shown in FIG. 6.

FIG. 6 illustrates phase voltage waveforms of U phase, V phase and W phase when no duty ratio correction is performed through PWM control of a power device by a general-purpose microcontroller with the horizontal axis representing a time scale and the vertical axis representing a voltage level. FIG. 7 illustrates waveforms of the respective inter-line voltages between U phase and V phase, between V phase and W phase and between W phase and U phase produced by the phase voltages shown in FIG. 6, with the horizontal axis representing a time scale and the vertical axis representing a voltage level.

That is, when the power device is not PWM-controlled by the general-purpose microcontroller to perform duty ratio corrections, since the target duty ratio of the PWM signal have uncontrollably high values (e.g., 95%) in the vicinity of areas where the voltage values are close to peak voltages of the sine waves of the respective phase voltages of the U phase, V phase and W phase, the duty ratios in the vicinity of the areas become 100% controllable duty ratios. As a result, as shown in FIG. 6, the waveforms of the respective phase voltages of the U phase, V phase and W phase reach the voltage level of the input power supply of the power device in the vicinity of the peak values of the sine waves. That is, the waveforms of the respective phase voltages of the U phase, V phase and W phase result in not sine waves but waveforms including distortion as shown in FIG. 6.

Therefore, the waveforms of the respective inter-line voltages between U phase and V phase, between V phase and W phase and between W phase and U phase produced by the phase voltages shown in FIG. 6 become waveforms including distortion as shown in FIG. 7. Thus, since the respective inter-line voltages of the waveforms including distortion as shown in FIG. 7 are applied between U phase and V phase, between V phase and W phase and between W phase and U phase of the three-phase motor, the ripple component of the motor current flowing through the three-phase motor increases. As a result, the torque ripple of the three-phase motor increases, producing rotation variations in the three-phase motor and the power compressor, increasing sound and vibration, and also causing efficiency of the three-phase motor to deteriorate.

Figure 8:
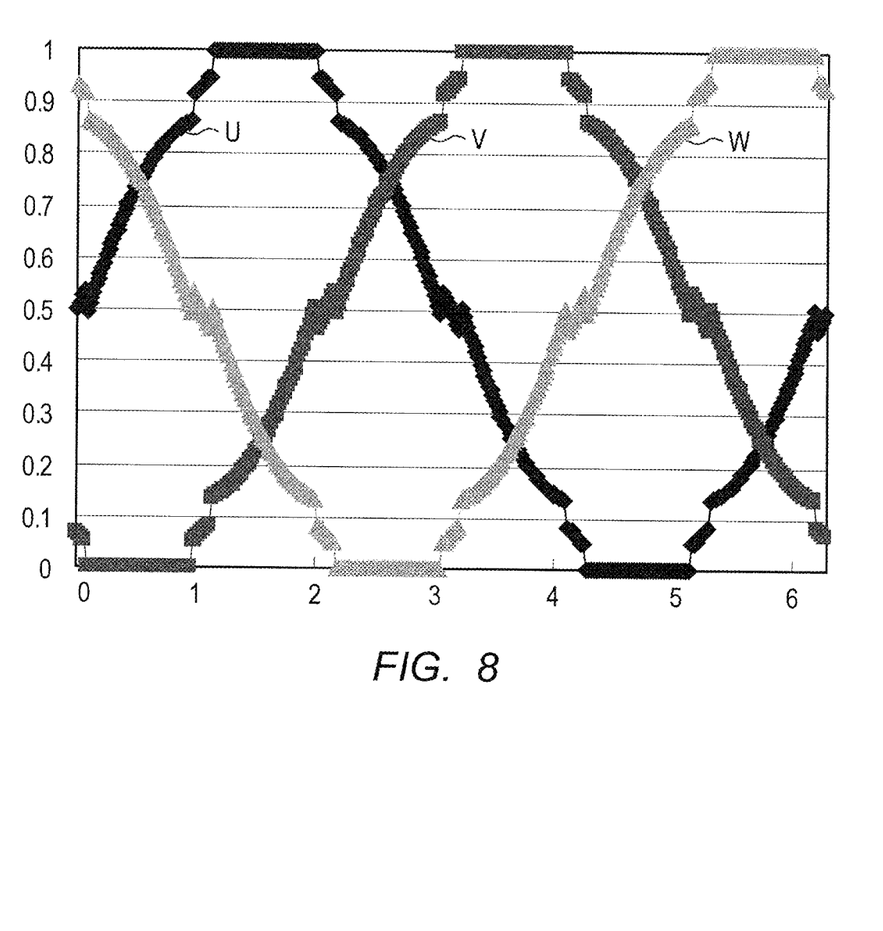
FIG. 8 illustrates phase voltage waveforms of the U phase, V phase and W phase when duty ratio correction is made through PWM control of the power device by the general-purpose microcontroller.
Figure 9:
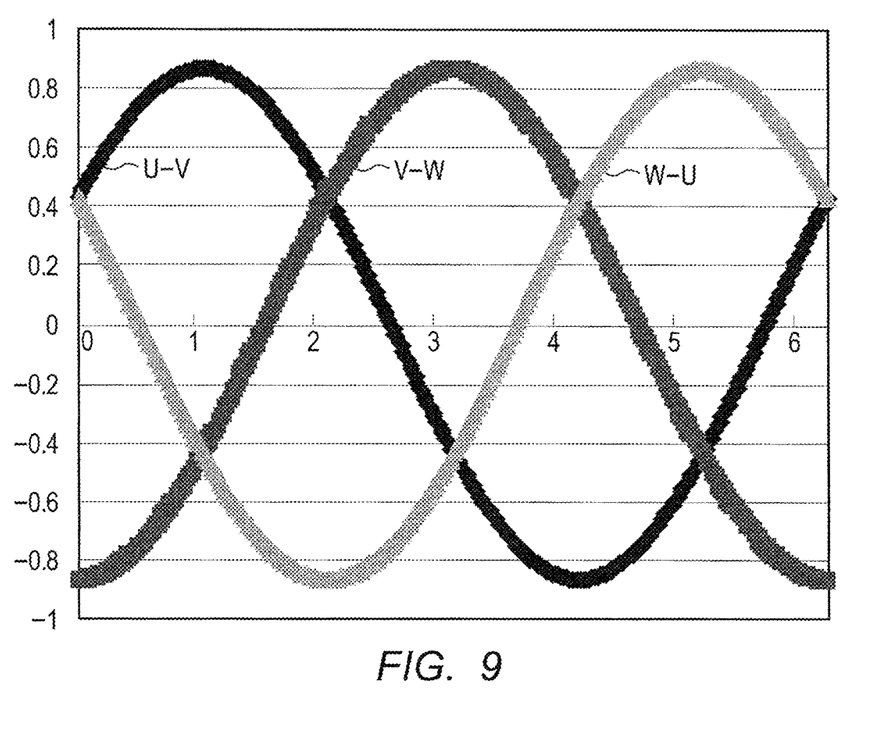
FIG. 9 illustrates waveforms of the respective inter-line voltages between U phase and V phase, between V phase and W phase and between W phase and U phase produced by the phase voltages as shown in FIG. 8.

FIG. 8 illustrates phase voltage waveforms of the U phase, V phase and W phase when duty ratio correction is performed through PWM control of the power device by the general-purpose microcontroller, with the horizontal axis representing a time scale and the vertical axis representing a voltage level. FIG. 9 illustrates waveforms of the respective inter-line voltages between U phase and V phase, between V phase and W phase and between W phase and U phase produced by the phase voltages shown in FIG. 8, with the horizontal axis representing a time scale and the vertical axis representing a voltage level.

As shown in FIG. 8, at a point in time when the U phase voltage is set to a 100% controllable duty ratio (point in time close to time 1), a voltage portion corresponding to an increase in the voltage level of the U phase voltage is added to the target duty ratios of the V phase and W phase to increase the voltage levels of the V phase and W phase voltages. On the other hand, at a point in time (point in time close to time 2) when the U phase voltage corrected to a 100% controllable duty ratio is returned to a target duty ratio by normal PWM control to decrease its voltage level, the voltages of the V phase and W phase are also returned to target duty ratios by normal PWM control to decrease their voltage levels. By correcting the respective phase voltages of the U phase, V phase and W phase through such duty ratio corrections, the respective phase voltages of the U phase, V phase and W phase become voltage waveforms as shown in FIG. 8.

As a result, the waveforms of the respective inter-line voltages between U phase and V phase, between V phase and W phase and between W phase and U phase produced by the phase voltages as shown in FIG. 8 become sine-wave-like waveforms with distortion canceled out (removed) among phases as shown in FIG. 9. That is, the waveforms of the respective inter-line voltages between U phase and V phase, between V phase and W phase and between W phase and U phase shown in FIG. 9 become sine-wave-like waveforms substantially equivalent to the ideal inter-line voltages as shown in FIG. 5, and the motor current flowing through the three-phase motor becomes free of a ripple component. As a result, the inverter apparatus can drive the three-phase motor to rotate stably with high efficiency.

As described so far, the inverter apparatus according to the present invention has been specifically described based on the embodiment and examples, but the present invention is not limited to the embodiment above, and can be modified in various ways without departing from the spirit and scope of the present invention. For example, the above embodiment and examples have described duty ratio corrections of PWM signals in the power device, but it goes without saying that the duty ratio corrections of the present embodiment are also applicable to a case where a multi-phase inverter having four or more phases is PWM-controlled.

The disclosure of the specification, drawings, and abstract included in Japanese Patent Application No. 2012-99868 filed on Apr. 25, 2012, are incorporated herein by reference in its entirety.

INDUSTRIAL APPLICABILITY

According to the present invention, a general-purpose low-priced microcontroller is used, and motor control is performed by driving an inverter through optimum PWM control. Thus, the present invention can be used effectively for all kinds of devices using a motor, for example, home appliances such as air conditioning apparatuses, refrigerators, washing machines.

REFERENCE SIGNS LIST

1 Inverter apparatus
2 Power supply
3 Power device
4 Current detection section
5 Control section (control means)

5a Duty ratio calculation section
5b Duty ratio correction section
5c PWM output section
6 Motor

The invention claimed is:

1. An inverter apparatus that generates a signal for driving a multi-phase motor, the apparatus comprising:
a power device that converts DC power to AC power based on PWM signals and that outputs the AC power;
a current detection section that detects a motor current that flows from the power device into the multi-phase motor; and
a control section that controls a duty ratio for each phase of the multi-phase motor and that outputs the PWM signals based on the duty ratio to the power device, said control section comprising:
a duty ratio calculation section that calculates a target duty ratio of each phase of the multi-phase motor, including an arbitrary phase, based on a value of the motor current;
a duty ratio correction section that assumes a controllable duty ratio of the arbitrary phase to be 0% or 100% and an uncontrolled duty ratio to be a duty ratio uncontrollable in the arbitrary phase and that is: (1) greater than 0% and smaller than a lower threshold or (2) greater than an upper threshold and smaller than 100%; and
a PWM output section that applies the PWM signals of the controllable duty ratio and corrected duty ratios obtained by the duty ratio correction section to the power device, wherein:
when the target duty ratio of the arbitrary phase becomes the uncontrolled duty ratio,
the control section calculates a difference duty ratio which is a difference between the controllable duty ratio and the target duty ratio of the arbitrary phase,
the duty ratio correction section obtains corrected duty ratios for other phases except the arbitrary phase when the target duty ratio of the arbitrary phase calculated by the duty ratio calculation section becomes the uncontrolled duty ratio by adjusting respective target duty ratios for the other phases except the arbitrary phase by the difference duty ratio, and
the control section outputs to the power device, the PWM signals based on the controllable duty ratio of 100% for the arbitrary phase when the target duty ratio of the arbitrary phase exceeds the upper threshold or based on the controllable duty ratio of 0% for the arbitrary phase when the target duty ratio of the arbitrary phase falls below the lower threshold , and the PWM signals for other phases except the arbitrary phase based on the corrected duty ratios obtained by the duty ratio correction section.

2. An electrically-driven compressor used for an air conditioning apparatus comprising the inverter apparatus according to claim 1.

3. An inverter apparatus according to claim 1, wherein the duty ratio correction section obtains the corrected duty ratios for the other phases except the arbitrary phase by adding the difference duty ratio to the respective target duty ratios for the other phases except the arbitrary phase when the uncontrolled duty ratio is greater than the upper threshold and smaller than 100%.

4. An inverter apparatus according to claim 1, wherein the duty ratio correction section obtains the corrected duty ratios for the other phases except the arbitrary phase by subtracting the difference duty ratio from the respective target duty ratios for the other phases except the arbitrary phase when the uncontrolled duty ratio is greater than 0% and smaller than the lower threshold.

5. An inverter apparatus according to claim 1, wherein the lower threshold is 5% and the upper threshold is 95%.

* * * * *